Sept. 27, 1955  E. KUSTUSCH  2,718,706
AMPLIFYING FLUSH PIN GAUGE

Filed June 9, 1954  2 Sheets-Sheet 1

INVENTOR.
ERYK KUSTUSCH
BY Louis Chayka
ATTORNEY.

Sept. 27, 1955 E. KUSTUSCH 2,718,706
AMPLIFYING FLUSH PIN GAUGE
Filed June 9, 1954 2 Sheets-Sheet 2

INVENTOR.
ERYK KUSTUSCH.
BY Louis Chayka
ATTORNEY

United States Patent Office

2,718,706
Patented Sept. 27, 1955

2,718,706

AMPLIFYING FLUSH PIN GAUGE

Eryk Kustusch, Detroit, Mich., assignor to Paul W. Kustusch, Detroit, Mich.

Application June 9, 1954, Serial No. 435,449

5 Claims. (Cl. 33—169)

The gauge is of a type adapted to check the depth of a bore for the purpose of ascertaining whether said depth is within the limits of a permissible tolerance.

The object of the invention is to provide a gauge which will indicate the acceptable depth of a bore by a linear movement of a member to a distance exceeding by a number of times the distance of the actual departure from the set standard.

A further object of the invention is to provide a gauge which will not require any dials and which will indicate results automatically and immediately.

I shall now describe said invention with reference to the accompanying drawings in which.

Similar numerals refer to similar parts throughout the several views.

The gauge includes a solid, oblong base 10 provided, midway its length, with a vertical bore 11 opening, at the bottom, into a counterbore 12 of an expanded diameter. Rising upwardly from the base, midway its length, and integrally formed therewith, is a cylindrical casing generally indicated by numeral 13, the casing being axially alined with said bore 11.

Figure 1:
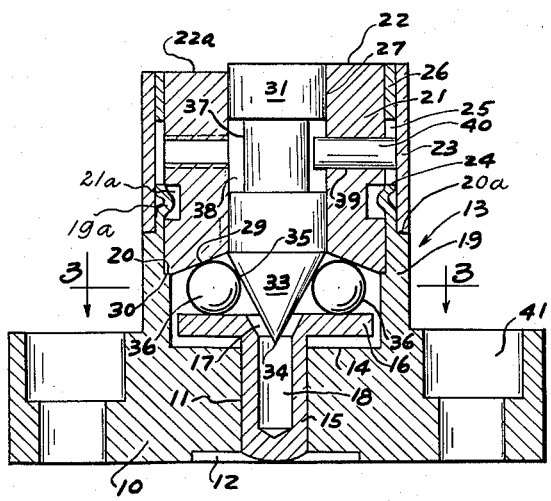
Fig. 1 is a vertical sectional view of the gauge.

The bottom 14 of the casing, as best shown in Fig. 1, presents a horizontal, flat surface. Slidably disposed within said bore 11 is a cylindrical pin 15 including a horizontally-disposed head or platform 16. The latter is provided with an axial, cone-shaped aperture 17 leading into an axial bore 18.

At a level spaced from the top of the platform, the inner surface of the wall 19 of the casing 13 contains an annular shoulder 20, the shoulder serving as a means of support for a thick-walled bushing 21. Another shoulder, 20a, on the outer surface of the casing 13, supports a vertical collar 23 which at its lower end is in a frictional contact with the outer surface of said casing 13 but which at its upper portion extends above the upper rim 24 of the wall 19 of the casing and is in a spaced relation to the bushing 21, as shown at 25. The spacing is annular extending all around said core, and extends vertically to a liner 26 which is disposed between said collar 23 and the bushing. The top surface of the bushing is divided diametrically into two semi-circular segments disposed at two levels, the segment at high level being marked 22, the lower segment being marked 22a, and the substantially vertical step therebetween being marked 22b.

The bushing contains an axial, circular aperture 27 and is defined at the top 28 by flat surfaces. However, at the lower end the bottom surface 29 of the wall of the bushing is slanted upwardly from its outer rim 30 towards the axis of the core. As the angle of the slant is an important feature of the gauge, I shall refer to it with more detail in the course of this specification.

As the bushing is to be in a stationary position within the casing, this is effected by having the wall of the casing pinched, as shown at 19a, for engagement with a recess 21a in the outer surface of the bushing 21.

Slidingly disposed within aperture 27 in the bushing 21 is a pin 31 terminating with a flat top surface 32. At the lower end, the pin terminates with an inverted cone 33, the apex 34 thereof projecting through the cone-shaped aperture 17 in said platform 16.

Here I wish to point out that the angle of the side of the cone to the angle of the bottom surface 29 of the bushing 21 is 90°. Located on the platform 16, within the space defined by the side surface of the cone and the undersurface 29 of the bushing 21, are a plurality of balls 36.

The mid-portion 37 of the pin is of a reduced diameter so that there is a free annular space 38 thereabout. Disposed transversely in the wall of the bushing, in apertures 39, are two bars 40 in a diametrically-alined relation, each projecting radially into the space 38 but each being out of contact with said pin 31. It is the object of the sleeve 23 to keep the bars from being displaced outwardly.

Returning to the base 10, I wish to add that it is provided with two holes 41 for application of bolts 42 by means of which the base is secured to a supporting bar 43. The bar contains an aperture 44 axially alined with the aperture 11 in the base 10, and disposed in said aperture is a vertical depth-probing pin 45 which on one side contains a slot 46. A rod, projecting into said slot laterally, that is, at right angles to the axis of said pin 45, limits the extent of the vertical movement of said pin within said aperture 44. The rod, which is marked 47, is disposed laterally to the length of bar 43.

The manner in which the gauge is to be used is as follows:

It will be assumed that the gauge is to be used to check the depth of a bore in a manufactured item which is to be produced in a large quantity, and that the object of the checking is to eliminate the articles in which the bore exceeds or does not reach the desired depth, within certain allowable tolerance.

Figure 4:
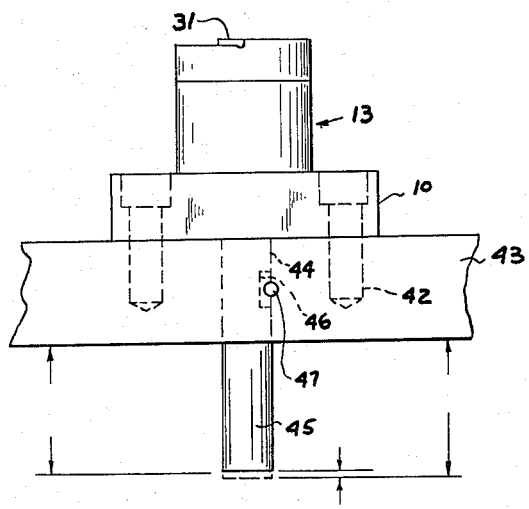
Fig. 4 is a side elevational view of the gauge and the platform on which it is mounted, the view including a pin adapted to probe the depth to be gauged.
Figure 6:
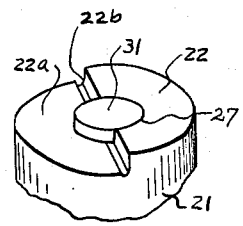
Fig. 6 is a perspective view of the upper part of the gauge.

To offer a specific example, it will be assumed that a bore in said item is to be two inches deep, to the limits of two thousandths of an inch. This being the requirement, the length of the depth-probing pin 45 will have to be exactly two inches plus the thickness of the supporting bar 43. The extent of the permissible tolerance is shown by opposed arrows in Fig. 4. When the gauge, including said probing pin, is set over a bore exactly two inches deep, the lower end of pin 15 will be at the level of the upper surface of the supporting bar 43.

If the bore should be two thousandths of an inch too shallow, the pin 45 would project upwardly above said level, and this, in turn, would result in lifting the pin 15 till its top surface would reach the high level 22 of the bushing.

Should the bore be deeper than two inches by the allowed limit of two thousandths of an inch, then the pin 45 would drop into contact with the bottom of the bore and would cause the top of the pin 37 to drop to the lower level of the bushing. If it dropped lower, it would indicate excessive depth.

Figure 2:
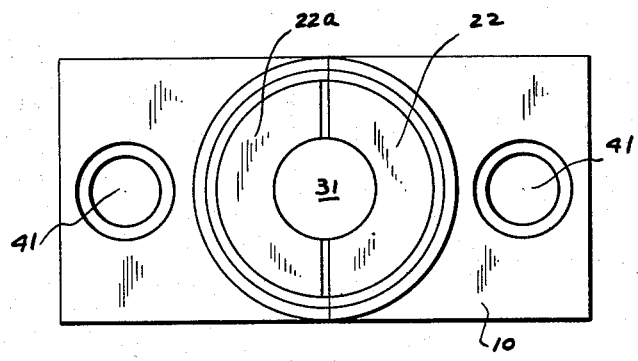
Fig. 2 is a top elevational view of the gauge.
Figure 3:
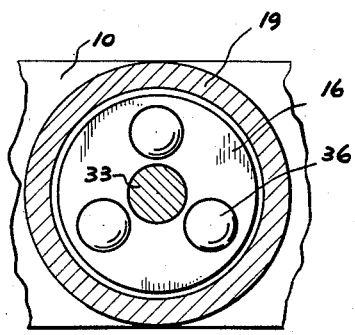
Fig. 3 is a sectional view on line 3—3 of Fig. 1.

In each case, whether the pin should be pushed upwardly or drops downwardly, the extent of vertical movement thereof, which is very minute, would be amplified by the gauge in the following manner:

It will be noted, on reference to the drawings, that the pin 15, which at its lower end is in contact with the upper end of the depth-probing pin 45, carries on its platform 16 a plurality of balls 36, preferably three in number, as shown in Fig. 3. Each ball is in contact with the platform, the side of the cone, and the slanting face 29 of the underside of the bushing 21.

Figure 7:
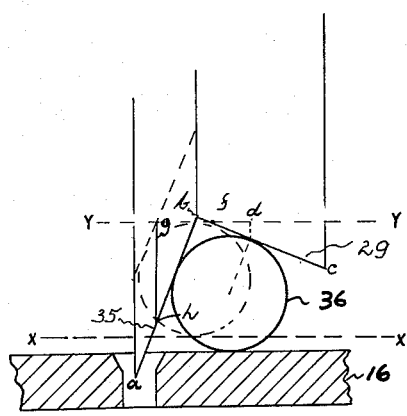
Fig. 7 shows a diagrammatic presentation of the relative positions of the operative members of the gauge.

Now, if the platform be raised by a unit of measurement by said probing pin 45, the balls, which cannot lift the stationary bushing, have to shift towards the axis of the cone 35. As the cone is movable, and as its side is at an angle to the level of the platform, the cone will be dislocated upwardly. This is shown in the drawings in Fig. 7 in which attention is directed to a single ball and its relative position with respect to the side 35 of the cone and the above-said slanting face 29 of the bushing.

The ball, as shown there, rests on said platform 16; line $a$—$b$ is the side of the cone; line $b$—$c$ is said face 29 at the bottom surface of the wall of the bushing 21, the lines intersecting each other at 90°. Line $x$—$x$ is the level to which the platform will be raised when the depth of a bore is less than two inches in the example given above.

As a result of the raise of said platform, the top of the ball will be lifted to a new level, marked by line $y$—$y$, and shifted towards the axis of the cone. It will now be on this line, specifically, at its intersection with the face 29, that the ball will be in contact with said face. The distance to which the ball will be shifted towards said axis will be equivalent to the length of line $d$—$f$. It is to the same distance, marked $b$—$g$, on line $y$—$y$, that the face of the cone has to adjust itself by a vertical shift, the extent of which is shown by vertical line $g$—$h$.

It will be noted that the length of said last-named line exceeds by a number of times the actual vertical shift of the depth-probing pin 45, this amplification resulting in the amplified range of vertical movement of the pin 31, the top surface of which is to be observed with reference to the two-level top of bushing 21.

At this juncture I wish to point out that the angle of the side of the cone to its axis must not be less than 20°, as at this angle there would be no sufficient leverage permitting the ball to shift the cone upwardly, but that the angle must also be less than 45°. It will be understood that the smaller said angle, within the range of the above limits, the more pronounced will be the amplification of the vertical movement of the pin 31.

The relation of the angles in the example given in the drawings, in Fig. 1, is such that resulting amplification is 5 to 1, the specific angle of the side of the cone to its axis being 26°32′54″.

It will be understood that the amplifying factor may be varied by varying the angles of the respective parts described above. Furthermore, the amplification secured by the above mechanism may be again amplified by another mechanism of the same construction placed in combination therewith at a higher level, as shown in Fig. 5.

Figure 5:
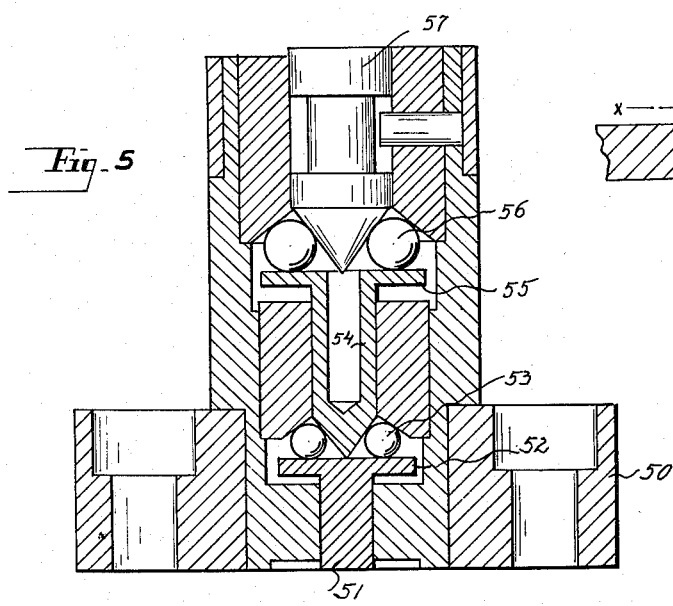
Fig. 5 is a vertical sectional view of a modified gauge.

In the modified species shown in Fig. 5, the gauge includes a base 50 and a pin 51 having a platform 52 which supports a set of balls 53 to lift a pin 54. The latter, again, is provided with a platform 55 which carries a set of balls 56 to lift another pin 57 which corresponds to pin 31 in Fig. 1. As the structure is but a duplication of the features shown in Fig. 1, and as the elements thereof work in the identical manner, no further description of the modified species appears to be needed.

After having described my gauge, what I wish to claim is as follows:

1. A flush pin amplifying gauge comprising a cylindrical casing open at the top and having an axial aperture in the bottom, a sliding vertical member disposed in said aperture and terminating at the top with a horizontal platform, a thick-walled cylindrical bushing fitting axially into the casing from above for a stationary relation therewith, the wall of the bushing being defined at the bottom by an annular face slanting upwardly towards the axis of the bushing, the top of the bushing being defined by a surface split diametrically into two flat areas at different levels, a pin axially disposed within the bushing for a sliding vertical movement therein, the lower end of the pin being formed into an inverted cone, the side surface of which is set at an angle of 90 degrees to the slanting face of the bushing, and a plurality of balls upon the platform, each ball being in contact with the side of the cone and the slanting face of the bushing.

2. A flush pin amplifying gauge comprising a cylindrical casing open at the top and having an axial aperture in the bottom, a sliding vertical member disposed in said aperture and terminating at the top with a horizontal platform, a thick-walled cylindrical bushing fitting axially into the casing from above for a stationary relation therewith, the wall of the bushing being defined at the bottom by an annular face slanting upwardly towards the axis of the bushing, the top of the bushing beind defined by a surface split diametrically into two flat areas at different levels, a pin axially disposed within the bushing for a sliding vertical movement therein, the lower end of the pin being formed into an inverted cone, the side surface of which is set at an angle of 90 degrees to the slanting face of the bushing, a plurality of balls upon the platform, each ball being in contact with the side of the cone and the slanting face of the bushing, a supporting bar below the casing, the bar having therein a vertical bore, and a sliding depth-probing pin disposed in said bore, the upper end of the pin being in contact with the lower end of the vertical sliding member terminating with the horizontal platform.

3. A flush pin amplifying gauge as defined in claim 1 in which the angle of the side of the cone to the axis thereof is not more than 45 degrees and not less than 20 degrees.

4. An amplifying flush pin gauge comprising a casing, a vertical sliding member therein, the lower end of which extends downwardly for a contact with a depth-probing rod, a platform on top of said sliding member terminating at the top with a horizontal platform, a stationary bushing axially fitting into the casing from above, the bushing comprising a thick wall defined at the bottom by a face slanting upwardly from its outer rim toward the axis of the casing, a vertical sliding pin axially disposed within said bushing and terminating at the lower end with an inverted cone, the side of which is set at 90 degrees to the slanting face of the bushing, a plurality of balls on the platform in an annular arrangement about the side of the cone, each of the balls bearing at one point against the side of the cone and at another point against said slanting face, the top of the pin reaching to the top of the bushing.

5. Means to indicate linear vertical movement of one member by a linear movement of another axially-alined member to a distance exceeding by a number of times the movement of the first-named member, the means including a horizontal platform at the top of the first-named member, an inverted cone at the lower end of the second-named member, a stationary cylindrical member disposed above the platform in an axial but spaced relation thereto and having an annular face turned towards said platform but slanting upwardly to the axis of the cone, and a plurality of balls on the platform, each of them being in contact with the side of the cone and the annular slanting face, the side of the cone being set at 90 degrees to said slanting annular face but at less than 45 degrees to the axis of said cone.

No references cited.